(12) United States Patent
Jin et al.

(10) Patent No.: US 12,308,733 B2
(45) Date of Patent: May 20, 2025

(54) POWER CONVERSION CIRCUIT

(71) Applicant: Delta Electronics, Inc., Taoyuan (TW)

(72) Inventors: Da Jin, Shanghai (CN); Yahong Xiong, Shanghai (CN); Litao Qian, Shanghai (CN); Qinghua Su, Shanghai (CN)

(73) Assignee: Delta Electronics, Inc., Taoyuan (TW)

( * ) Notice: Subject to any disclaimer, the term of this patent is extended or adjusted under 35 U.S.C. 154(b) by 311 days.

(21) Appl. No.: 17/987,701

(22) Filed: Nov. 15, 2022

(65) Prior Publication Data

US 2023/0179094 A1    Jun. 8, 2023

(30) Foreign Application Priority Data

Dec. 6, 2021   (CN) .......................... 202111477540.5

(51) Int. Cl.
*H02M 3/07* (2006.01)
*H02M 1/00* (2006.01)
*H02M 3/158* (2006.01)

(52) U.S. Cl.
CPC ......... *H02M 1/0095* (2021.05); *H02M 3/072* (2021.05); *H02M 3/1584* (2013.01)

(58) Field of Classification Search
CPC .................................................. H02M 1/0095
See application file for complete search history.

(56) References Cited

U.S. PATENT DOCUMENTS

| | | | |
|---|---|---|---|
| 10,027,223 B1 * | 7/2018 | Zhang | H02M 3/07 |
| 10,141,849 B1 | 11/2018 | Jiang et al. | |
| 10,700,618 B2 | 6/2020 | Glovinsky et al. | |
| 11,581,796 B2 | 2/2023 | Yan et al. | |

(Continued)

FOREIGN PATENT DOCUMENTS

| | | |
|---|---|---|
| CA | 3056408 A1 | 3/2020 |
| CN | 102769377 B | 7/2014 |

(Continued)

OTHER PUBLICATIONS

K. Abe, K. Nishijima, K. Harada, T. Nakano, T. Nabeshima and T. Sato, "A Novel Three-Phase Buck Converter with Bootstrap Driver Circuit," 2007 IEEE Power Electronics Specialists Conference, Orlando, FL, USA, 2007, pp. 1864-1871 (Year: 2007).*

*Primary Examiner* — Peter M Novak
(74) *Attorney, Agent, or Firm* — KIRTON McCONKIE; Evan R. Witt (57) ABSTRACT

A power conversion circuit is provided. In the power conversion circuit, a three-switch unit of a switch bridge arm includes first, second and third terminals and upper, middle and lower switches serially connected between the first and third terminals sequentially. The upper and lower switches are turned on and off synchronously. A grounding switch is coupled between the third terminal and a negative input terminal. A cross-connected storage capacitor is electrically connected between a node between the upper and middle switches and the third terminal. A diode, a capacitor and a driving unit of a floating driving circuit are electrically connected between the upper and lower switches. A connection node between the diode and the capacitor is electrically connected to a driving terminal of the upper switch. A connection node between the capacitor and the driving unit is electrically connected to a driving terminal of the lower switch.

19 Claims, 8 Drawing Sheets

(56) References Cited

U.S. PATENT DOCUMENTS

| | | |
|---|---|---|
| 11,601,049 B2 | 3/2023 | Jong et al. |
| 2008/0205098 A1 | 8/2008 | Xu et al. |
| 2019/0273436 A1 | 9/2019 | Tang et al. |
| 2019/0348913 A1 | 11/2019 | Zhang et al. |
| 2020/0212795 A1 | 7/2020 | Das et al. |
| 2020/0251979 A1 | 8/2020 | Jin et al. |
| 2020/0321860 A1 | 10/2020 | Amin et al. |
| 2022/0014086 A1 | 1/2022 | Ye et al. |
| 2022/0014109 A1 | 1/2022 | Ye et al. |
| 2022/0103066 A1 | 3/2022 | Chen et al. |
| 2022/0166314 A1 | 5/2022 | Chen et al. |
| 2022/0190738 A1 | 6/2022 | Chen et al. |
| 2022/0255441 A1 | 8/2022 | Ye et al. |
| 2022/0376603 A1 | 11/2022 | Liu et al. |
| 2023/0020726 A1 | 1/2023 | Jin et al. |
| 2023/0026364 A1 | 1/2023 | Kulkarni |
| 2023/0179094 A1 | 6/2023 | Jin et al. |
| 2023/0216413 A1 | 7/2023 | Kumar et al. |
| 2023/0387813 A1 | 11/2023 | Dong et al. |

FOREIGN PATENT DOCUMENTS

| | | |
|---|---|---|
| CN | 110915118 A | 3/2020 |
| CN | 112769332 A | 5/2021 |
| CN | 115763012 A | 3/2023 |
| KR | 20230161756 A | 11/2023 |
| WO | 2020206270 A1 | 10/2020 |
| WO | 2022072658 A1 | 4/2022 |
| WO | 2023164566 A1 | 8/2023 |

\* cited by examiner

POWER CONVERSION CIRCUIT

CROSS-REFERENCE TO RELATED APPLICATION

This application claims priority to China Patent Application No. 202111477540.5, filed on Dec. 6, 2021, the entire contents of which are incorporated herein by reference for all purposes.

FIELD OF THE INVENTION

The present disclosure relates to a power conversion circuit, and more particularly to a buck power conversion circuit.

BACKGROUND OF THE INVENTION

As the power consumption of chips (e.g., CPU, GPU and ASIC) increases, the requirements of miniaturization for the voltage regulation module which supplies power to chips are getting higher and higher. In order to realize the miniaturization of the voltage regulation module, the voltage regulation module needs to adopt lower input voltage (e.g., 5V) for reducing the size of the inductor within the voltage regulation module. Accordingly, the overall volume of the voltage regulation module is reduced, and the power conversion density and conversion efficiency of the voltage regulation module are increased. However, since the voltage provided to the voltage regulation module by the voltage source of the conventional power supply system is high (e.g., 54V), the voltage regulation module can only receive the high input voltage from the voltage source of the power supply system. Namely, the voltage regulation module cannot receive the required lower input voltage from the voltage source of the power supply system directly. Therefore, the overall volume of the voltage regulation module cannot be reduced, and the power conversion density and conversion efficiency of the voltage regulation module cannot be increased.

Therefore, there is a need of providing a power conversion circuit in order to overcome the drawbacks of the conventional technologies.

SUMMARY OF THE INVENTION

The present disclosure provides a power conversion circuit to achieve the function of voltage reduction.

In accordance with an aspect of the present disclosure, a power conversion circuit is provided. The power conversion circuit includes a positive input terminal, a negative input terminal, a positive output terminal, a negative output terminal, a switch bridge arm, a first grounding switch, a first cross-connected storage capacitor and a first floating driving circuit. The negative input terminal is electrically connected to the negative output terminal and is grounded. The switch bridge arm includes at least one three-switch unit, and the three-switch unit includes a first terminal, a second terminal, a third terminal, an upper switch, a middle switch and a lower switch. The upper switch, the middle switch and the lower switch are electrically connected in series between the first terminal and the third terminal sequentially. The first terminal is electrically connected to the positive input terminal, and the upper switch and the lower switch are turned on and off synchronously. The first grounding switch is coupled between the third terminal and the negative input terminal. The first cross-connected storage capacitor has a first terminal electrically connected to the upper switch and the middle switch and a second terminal electrically connected to the third terminal. The first floating driving circuit includes a first floating driving diode, a first floating driving capacitor and a first floating driving unit electrically connected in series between a first terminal of the upper switch and a first terminal of the lower switch sequentially. A connection node connecting the first floating driving diode and the first floating driving capacitor is further electrically connected to a driving terminal of the upper switch. A connection node connecting the first floating driving capacitor and the first floating driving unit is further electrically connected to a driving terminal of the lower switch.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
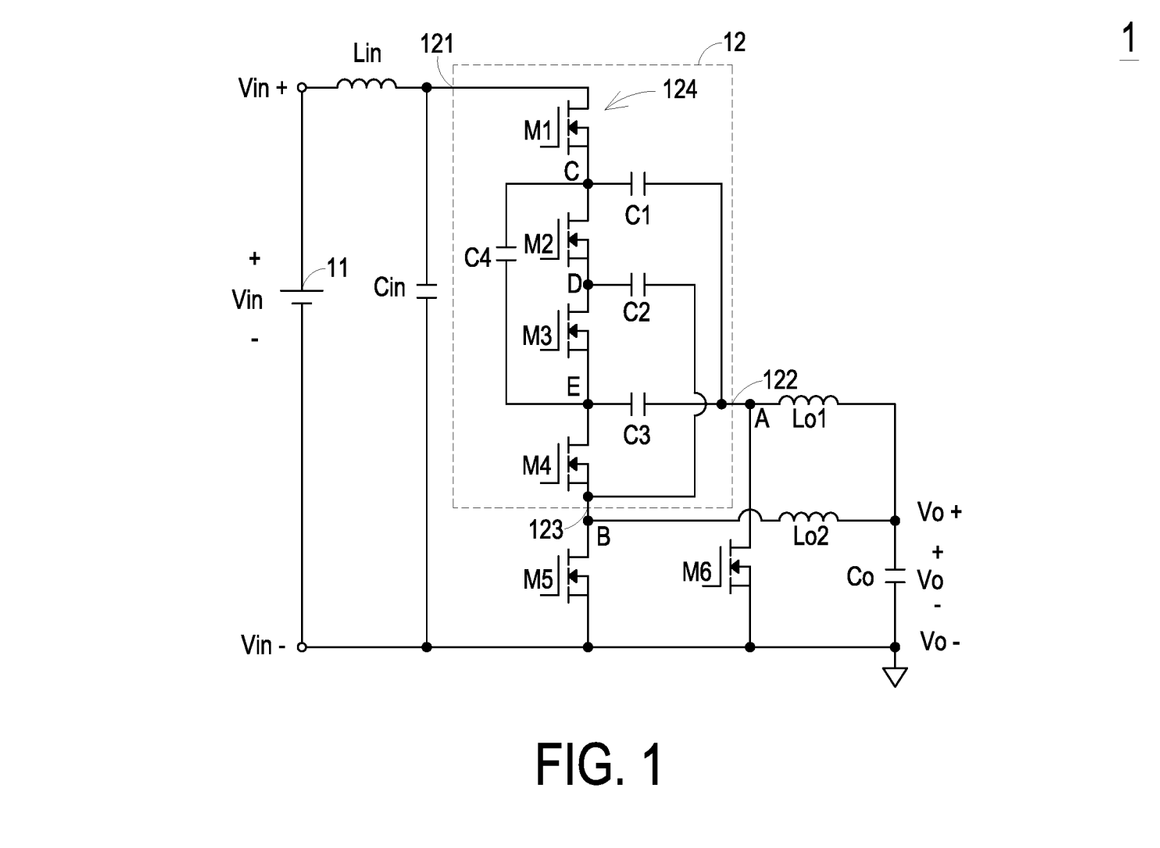
FIG. 1 is a schematic circuit diagram illustrating a power conversion circuit according to a first embodiment of the present disclosure.

Please refer to FIG. 1. FIG. 1 is a schematic circuit diagram illustrating a power conversion circuit according to a first embodiment of the present disclosure. In this embodiment, the power conversion circuit 1 is a switch capacitor buck converter and is electrically connected between a voltage source 11 of a power supply system and a load (not shown), and the load is for example but not limited to a voltage regulation module. The power conversion circuit 1 is configured to convert an input voltage Vin provided by the voltage source 11 and generate an output voltage Vo to the load. The power conversion circuit 1 includes a positive input terminal Vin+, a negative input terminal Vin−, a positive output terminal Vo+, a negative output terminal Vo−, an input inductor Lin, an input capacitor Cin, a switch control assembly 12, a first output inductor Lo1, a second output inductor Lo2, a first grounding switch M5, a second grounding switch M6, and an output capacitor Co. The positive input terminal Vin+ and the negative input terminal Vin− are electrically connected to two terminals of the voltage source 11 respectively, and the power conversion circuit 1 receives the input voltage Vin through the positive input terminal Vin+ and the negative input terminal Vin−. The positive output terminal Vo+ and the negative output terminal Vo− are electrically connected to the load, and the power conversion circuit 1 outputs the output voltage Vo to the load through the positive output terminal Vo+ and the negative output terminal Vo−. The negative output terminal Vo− is electrically connected to the negative input terminal Vin− and is grounded. A first terminal of the input inductor Lin is electrically connected to the positive input terminal Vin+, and two terminals of the input capacitor Cin are electrically connected to a second terminal of the input inductor Lin and the negative input terminal Vo− respectively.

The switch control assembly 12 includes a first terminal 121, a second terminal 122, a third terminal 123, a switch bridge arm 124, n storage capacitors (C1, C2, C3) and a clamping capacitor C4, where n is an integer greater than 1. The switch bridge arm 124 includes n+1 switches (M1, M2, M3, M4). In this embodiment, as an example, n equals 3. The first terminal 121 of the switch control assembly 12 is electrically connected to the positive input terminal Vin+. The second terminal 122 of the switch control assembly 12 is electrically connected to a first terminal of the first output inductor Lo1 to form a first connection node A. The third terminal 123 of the switch control assembly 12 is electrically connected to a first terminal of the second output inductor Lo2 to form a second connection node B. The switch bridge arm 124 is electrically connected between the first terminal 121 and the third terminal 123 of the switch control assembly 12, and the switch bridge arm 124 includes a first switch M1, a second switch M2, a third switch M3, and a fourth switch M4 electrically connected in series sequentially. Each switch of the switch bridge arm 124 is switched between an on state and an off state. The first switch M1 is electrically connected to the first terminal 121 of the switch control assembly 12. The first switch M1 and the second switch M2 are electrically connected in series to form a third connection node C. The second switch M2 and the third switch M3 are electrically connected in series to form a fourth connection node D. The third switch M3 and the fourth switch M4 are electrically connected in series to form a fifth connection node E. The switch of the switch bridge arm 124 is for example but not limited to a metal-oxide-semiconductor field-effect transistor (MOSFET), a GaN field effect transistor (GaN FET), or an insulated gate bipolar transistor (IGBT). In this embodiment, all the switches of the switch bridge arm 124 are exemplified as MOSFETs.

The n storage capacitors of the switch control assembly 12 include a first storage capacitor C1, a second storage capacitor C2 and a third storage capacitor C3. The first storage capacitor C1 is electrically connected between the first connection node A and the third connection node C and is configured for storing electrical energy. The second storage capacitor C2 is electrically connected between the second connection node B and the fourth connection node D and is configured for storing electrical energy. The third storage capacitor C3 is electrically connected between the first connection node A and the fifth connection node E and is configured for storing electrical energy. The clamping capacitor C4 is electrically connected between the third connection node C and the fifth connection node E.

In this embodiment, the second switch M2 and the third switch M3 are electrically connected between two terminals of the clamping capacitor C4. When the second switch M2 and the third switch M3 are switched, the clamping capacitor C4 is used to clamp a drain-source voltage of the second switch M2 and a drain-source voltage of the third switch M3. The third switch M3 and the fourth switch M4 are electrically connected between two terminals of the second storage capacitor C2. In addition to storing electric energy, the second storage capacitor C2 may clamp the drain-source voltage of the third switch M3 and a drain-source voltage of the fourth switch M4 when the third switch M3 and the fourth switch M4 are switched. Two terminals of the first switch M1 are electrically connected to the input capacitor Cin and the clamping capacitor C4 respectively, and two terminals of the first grounding switch M5 are electrically connected to the input capacitor Cin and the second storage capacitor C2 respectively. When the first switch M1 and the first grounding switch M5 are switched, the clamping capacitor C4, the input capacitor Cin and the second storage capacitor C2 clamp the voltage across the first switch M1 and the voltage across the first grounding switch M5 collaboratively. In addition, the two terminals of the first switch M1 are connected to the input capacitor Cin and the first storage capacitor C1 respectively, and two terminals of the second grounding switch M6 are electrically connected to the input capacitor Cin and the first storage capacitor C1 respectively. When the first switch M1 and the second grounding switch M6 are switched, the input capacitor Cin and the first storage capacitor C1 clamp the voltage across the first switch M1 and the voltage across the second grounding switch M6 collaboratively.

The first output inductor Lo1 and the second output inductor Lo2 are disposed independently from each other. The first terminal of the first output inductor Lo1 is electrically connected to the second terminal 122 of the switch control assembly 12, and a second terminal of the first output inductor Lo1 is electrically connected to the positive output terminal Vo+. The first terminal of the second output inductor Lo2 is electrically connected to the third terminal 123 of the switch control assembly 12, and a second terminal of the second output inductor Lo2 is electrically connected to the positive output terminal Vo+. The first grounding switch M5 is electrically connected between the second connection node B and the negative output terminal Vo−, and the second grounding switch M6 is electrically connected between the first connection node A and the negative output terminal Vo−. The first grounding switch M5 and the second grounding switch M6 are for example but not limited to MOSFETs, GaN FETs or IGBTs. The output capacitor Co is electrically connected between the positive output terminal Vo+ and the negative output terminal Vo−.

In this embodiment, the power conversion circuit 1 further includes a plurality of driving units (not shown) and a control circuit (not shown). The number of the plurality of driving units may be equal to the number of the switches of the power conversion circuit 1. For example, the number of the plurality of driving units is six, and the six driving units are electrically connected to the first switch M1, the second switch M2, the third switch M3, the fourth switch M4, the first grounding switch M5, and the second grounding switch M6 one-to-one. The control circuit is electrically connected to the six driving units for driving the first switch M1, the second switch M2, the third switch M3, the fourth switch M4, the first grounding switch M5 and the second grounding switch M6. The control circuit generates six driving signals, and each driving unit generates a PWM signal to drive the corresponding switch according to the corresponding driving signal. Consequently, the power conversion circuit 1 utilizes the PWM signals to drive the switches for achieving the function of reducing the input voltage Vin to the output voltage Vo. The operation of the power conversion circuit 1 would be described in detail as follows according to the oscillogram of switches.

Figure 2:
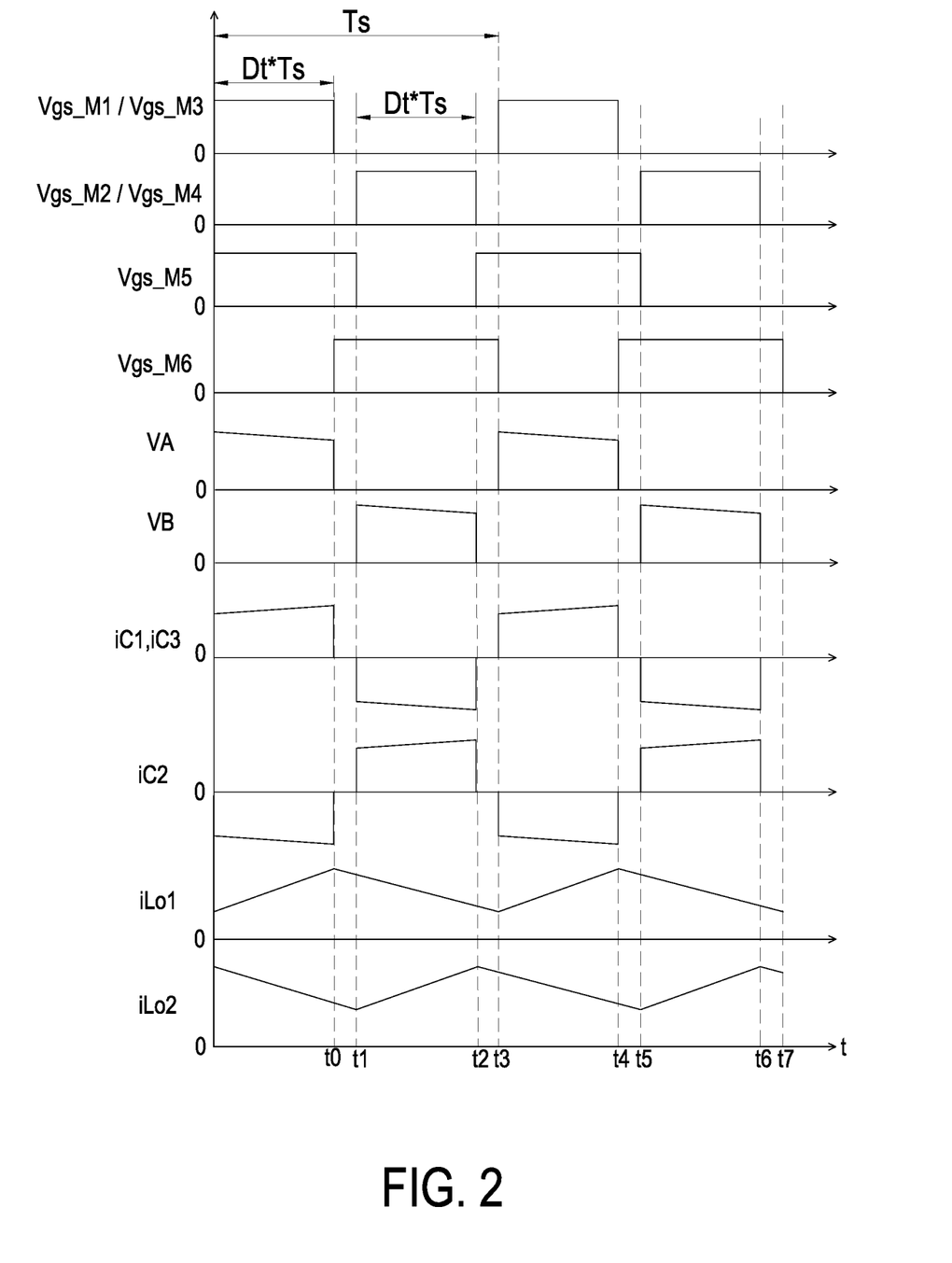
FIG. 2 is a schematic oscillogram of some components of the power conversion circuit shown in FIG. 1.

Please refer to FIG. 2 with FIG. 1. FIG. 2 is a schematic oscillogram of some components of the power conversion circuit shown in FIG. 1. In FIG. 2, Vgs_M1, Vgs_M2, Vgs_M3, Vgs_M4, Vgs_M5, and Vgs_M6 are the gate-source voltages of the first switch M1, the second switch M2, the third switch M3, the fourth switch M4, and the first grounding switch M5, and the second grounding switch M6 respectively. VA is the voltage of the first connection node A, and VB is the voltage of the second connection node B. iC1, iC2 and iC3 are the currents flowing through the first storage capacitor C1, the second storage capacitor C2 and the third storage capacitor C3 respectively. iLo1 and iLo2 are the currents flowing through the first output inductor Lo1 and the second output inductor Lo2 respectively.

As shown in FIG. 2, the period from 0 to time t3 is one switching cycle Ts, and the first switch M1 and the third switch M3 receive a first driving signal to turn on and off synchronously. The first switch M1 and the third switch M3 are exemplified as MOSFETs, and the first driving signal is corresponding to Vgs_M1 and Vgs_M3. The duty ratio of the first driving signal equals Dt (i.e., the duty ratio of the power conversion circuit 1), which is less than or equal to 50%. Namely, in one switching cycle Ts, the turn-on duration of the first switch M1 and the third switch M3 equals Dt*Ts. A second driving signal received by the second grounding switch M6 is complementary to the first driving signal. The second grounding switch M6 is exemplified as a MOSFET, and the second driving signal is corresponding to Vgs_M6. The duty ratio of the second driving signal equals 1−Dt, that is, in one switching cycle Ts, the turn-on duration of the second grounding switch M6 equals (1−Dt)*Ts. The second switch M2 and the fourth switch M4 receive a third driving signal to turn on and off synchronously. The second switch M2 and the fourth switch M4 are exemplified as MOSFETs, and the third driving signal is corresponding to Vgs_M2 and Vgs_M4. The duty ratio of the third driving signal equals Dt, that is, in one switching cycle Ts, the turn-on duration of the second switch M2 and the fourth switch M4 equals Dt*Ts. In addition, in this embodiment, the third driving signal and the first driving signal are out of phase with each other by 180 degrees and have the same duty ratio. A fourth driving signal received by the first grounding switch M5 is complementary to the third driving signal. The first grounding switch M5 is exemplified as a MOSFET, and the fourth driving signal is corresponding to Vgs_M5. The duty ratio of the fourth driving signal equals 1−Dt, that is, in one switching cycle Ts, the turn-on duration of the first grounding switch M5 equals (1−Dt)*Ts.

According to the oscillogram of FIG. 2 and the circuit diagram of FIG. 1, during the period from 0 to time t0, the first switch M1 and the third switch M3 are turned on, and the second switch M2 and the fourth switch M4 are turned off. Therefore, the input capacitor Cin and the first storage capacitor C1 are connected in series to provide a current to the first output inductor Lo1, and the second storage capacitor C2 and the third storage capacitor C3 are connected in series to provide a current to the first output inductor Lo1. The currents flowing through the first storage capacitor C1, the second storage capacitor C2, and the third storage capacitor C3 have the same current amplitude, which is equal to a half of the amplitude of the current flowing through the first output inductor Lo1. Moreover, the direction of the current flowing through the second storage capacitor C2 is opposite to the direction of the currents flowing through the first storage capacitor C1 and the third storage capacitor C3. At this time, the voltage amplitude of the first connection node A (connected to the first output inductor Lo1) equals the amplitude difference between the DC components of the voltages of the input capacitor Cin and the first storage capacitor C1, or equals the amplitude difference between the DC components of the voltages of the second storage capacitor C2 and the third storage capacitor C3. As shown in FIG. 2, the voltage VA of the first connection node A is applied to the first output inductor Lo1, thereby increasing the current iLo1 flowing through the first output inductor Lo1 gradually. In addition, the voltage VB of the second connection node B connected to the second output inductor Lo2 equals 0, namely no voltage is applied to the second output inductor Lo2 from the second connection node B. Therefore, the current iLo2 flowing through the second output inductor Lo2 decreases gradually.

During the period from time t0 to t1, which is a dead time, the first switch M1, the second switch M2, the third switch M3 and the fourth switch M4 are all turned off. The amplitudes of the currents flowing through the first storage capacitor C1, the second storage capacitor C2 and the third storage capacitor C3 are all equal to 0. Therefore, the voltage VA of the first connection node A connected to the first output inductor Lo1 and the voltage VB of the second connection node B connected to the second output inductor Lo2 are both equal to 0. Accordingly, since no voltage is applied to the first output inductor Lo1 from the first connection node A, the current iLo1 flowing through the first output inductor Lo1 decreases gradually. Similarly, since no voltage is applied to the second output inductor Lo2 from the second connection node B, the current iLo2 flowing through the second output inductor Lo2 also decreases gradually.

During the period from time t1 to t2, the first switch M1 and the third switch M3 are turned off, and the second switch M2 and the fourth switch M4 are turned on. Therefore, the first storage capacitor C1 and the second storage capacitor C2 are connected in series to provide a current to the second output inductor Lo2, and meanwhile the third storage capacitor C3 also provides a current to the second output inductor Lo2. The currents flowing through the first storage capacitor C1, the second storage capacitor C2, and the third storage capacitor C3 have the same current amplitude, which is equal to a half of the amplitude of the current flowing through the second output inductor Lo2. Moreover, the direction of the current flowing through the second storage capacitor C2 is opposite to the direction of the currents flowing through the first storage capacitor C1 and the third storage capacitor C3. At this time, the voltage amplitude of the second connection node B (connected to the second output inductor Lo2) equals the DC component amplitude of the voltage of the third storage capacitor C3, or equals the amplitude difference between the DC components of the voltages of the first storage capacitor C1 and the second storage capacitor C2. As shown in FIG. 2, the voltage VB of the second connection node B is applied to the second output inductor Lo2, thereby increasing the current iLo2 flowing through the second output inductor Lo2 gradually. In addition, the voltage VA of the first connection node A connected to the first output inductor Lo1 equals 0, namely no voltage is applied to the first output inductor Lo1 from the first connection node A. Therefore, the current iLo1 flowing through the first output inductor Lo1 decreases gradually.

During the period from time t2 to t3, which is a dead time, the first switch M1, the second switch M2, the third switch M3 and the fourth switch M4 are all turned off. The amplitudes of the currents flowing through the first storage capacitor C1, the second storage capacitor C2 and the third storage capacitor C3 are all equal to 0. Therefore, the voltage VA of the first connection node A connected to the first output inductor Lo1 and the voltage VB of the second connection node B connected to the second output inductor Lo2 are both equal to 0. Accordingly, since no voltage is applied to the first output inductor Lo1 from the first connection node A, the current iLo1 flowing through the first output inductor Lo1 decreases gradually. Similarly, since no voltage is applied to the second output inductor Lo2 from the second connection node B, the current iLo2 flowing through the second output inductor Lo2 also decreases gradually.

According to the circuit diagram of the power conversion circuit 1 shown in FIG. 1 and the oscillogram of FIG. 2, it can be seen that the voltage of the first terminal of the first output inductor Lo1 (i.e., the voltage VA of the first connection node A) and the voltage of the first terminal of the second output inductor Lo2 (i.e., the voltage VB of the second connection node B) are jumping voltages. The cycle of the jumping voltages is the same as the switching cycle Ts of the power conversion circuit 1. During the period from 0 to time t0, the high voltage of the first terminal of the first output inductor Lo1 (i.e., the high voltage amplitude of the first connection node A) equals a difference between the DC component amplitude of the input voltage Vin and the DC component amplitude of the voltage of the first storage capacitor C1, or equals a difference between the DC component amplitude of the voltage of the second storage capacitor C2 and the DC component amplitude of the voltage of the third storage capacitor C3. The low voltage of the first terminal of the second output inductor Lo2 (i.e., the low voltage amplitude of the second connection node B) equals the voltage of the negative output terminal Vo−. During the period from time t1 to t2, the high voltage of the first terminal of the second output inductor Lo2 (i.e., the high voltage amplitude of the second connection node B) equals the DC component amplitude of the voltage of the third storage capacitor C3, or equals a difference between the DC component amplitude of the voltage of the first storage capacitor C1 and the DC component amplitude of the voltage of the second storage capacitor C2. The low voltage of the first terminal of the first output inductor Lo1 (i.e., the low voltage amplitude of the first connection node A) equals the voltage of the negative output terminal Vo−. As shown in FIG. 1, the second terminal of the first output inductor Lo1 is directly connected to the second terminal of the second output inductor Lo2, and thus the average voltage of the first terminal of the first output inductor Lo1 is equal to the average voltage of the first terminal of the second output inductor Lo2. Consequently, the amplitude difference between the DC components of the input voltage Vin and the voltage of the first storage capacitor C1, the amplitude difference between the DC components of the voltages of the second storage capacitor C2 and the third storage capacitor C3, the amplitude difference between the DC components of the voltages of the first storage capacitor C1 and the second storage capacitor C2, and the DC component amplitude of the voltage of the third storage capacitor C3 are equal. According to the above relations, it can be derived that the DC component amplitude of the voltage of the second storage capacitor C2 is two times of the DC component amplitude of the voltage of the third storage capacitor C3. The DC component amplitude of the voltage of the first storage capacitor C1 is three times of the DC component amplitude of the voltage of the third storage capacitor C3. The DC component amplitude of the input voltage Vin is four times of the DC component amplitude of the voltage of the third storage capacitor C3.

Further, according to the above relations, the DC component amplitude of the voltage across the first storage capacitor C1 is ¾ times of the DC component amplitude of the input voltage Vin. The DC component amplitude of the voltage across the second storage capacitor C2 is ½ times of the DC component amplitude of the input voltage Vin. The DC component amplitude of the voltage across the third storage capacitor C3 is ¼ times of the DC component amplitude of the input voltage Vin. The DC component amplitude of the high voltage of the first connection node A and the second connection node B is equal to Vin/(n+1). Among the first storage capacitor C1, the second storage capacitor C2 and the third storage capacitor C3, the power conversion circuit 1 obtains the output voltage Vo according to the storage capacitor with the lowest DC component amplitude of voltage (i.e., the third storage capacitor C3). The expression for the output voltage Vo is shown as Vo=Dt*VC3=Dt*Vin/(n+1), where Vo represents the voltage amplitude of the output voltage, Dt is the duty ratio of the first driving signal, VC3 is the DC component amplitude of the voltage of the third storage capacitor C3, Vin represents the DC component amplitude of the input voltage, n is the number of storage capacitors and is an integer greater than 1. For example, in the embodiment shown in FIG. 1, the power conversion circuit 1 includes three storage capacitors (C1, C2, C3), namely n=3, and thus Vo=Dt*VC3=Dt*Vin/4. In this embodiment, the voltage gain ratio of the output voltage Vo to the input voltage Vin is Dt/(n+1), where Dt is the duty ratio of the power conversion circuit 1. In an embodiment, the voltage amplitude of the first connection node A or the second connection node B equals the difference between the voltages of any two of the three storage capacitors (C1, C2, C3), or equals the voltage amplitude of any one of the three storage capacitors (C1, C2, C3), or equals the difference between the input voltage Vin and the voltage amplitude of any one of the three storage capacitors (C1, C2, C3). In an embodiment, the number of the storage capacitors of the power conversion circuit 1 is not limited to three and may be any number greater than 1, which would be described later.

According to the above descriptions based on the circuit diagram of the power conversion circuit 1 shown in FIG. 1 and the oscillogram of FIG. 2, the output voltage of the power conversion circuit 1 is shown as Vo=Dt*Vin/4. Therefore, in the power conversion circuit 1, the output voltage is greatly reduced relative to the input voltage, and thus the function of voltage reduction is achieved. In the example shown in FIG. 1, the power conversion circuit 1 has three storage capacitors, the duty ratio of the power conversion circuit 1 is expanded by four times, and the output voltage is reduced by four times. Moreover, a voltage-second product of the time and the voltage across the first output inductor Lo1 and a voltage-second product of the time and the voltage across the second output inductor Lo2 are both greatly reduced. Accordingly, the inductance, volume and loss of the first output inductor Lo1 and the second output inductor Lo2 are greatly reduced. Therefore, the load (i.e., the voltage regulation module) may receive the low output voltage outputted by the power conversion circuit 1, thereby reducing the overall volume of the voltage regulation module and increasing the power conversion density and conversion efficiency of the voltage regulation module.

In an embodiment, in order to reduce the current impact among the input capacitor Cin, the first storage capacitor C1, the second storage capacitor C2 and the third storage capacitor C3 during switching and reduce the switching loss of all the switches of the switch bridge arm 124, the relations between the capacities of the input capacitor Cin, the first storage capacitor C1, the second storage capacitor C2 and the third storage capacitor C3 should satisfy the following two equations. The first equation is $$C1 = C2 * \frac{C3}{C2 - C3},$$

and the second equation is $$Cin = C2 * \frac{1 - Dt}{2}.$$

In these two equations, Cin represents the capacitance of the input capacitor, C1 represents the capacitance of the first storage capacitor, C2 represents the capacitance of the second storage capacitor, C3 represents the capacitance of the third storage capacitor, and Dt is the duty ratio of the first driving signal.

Figure 3:
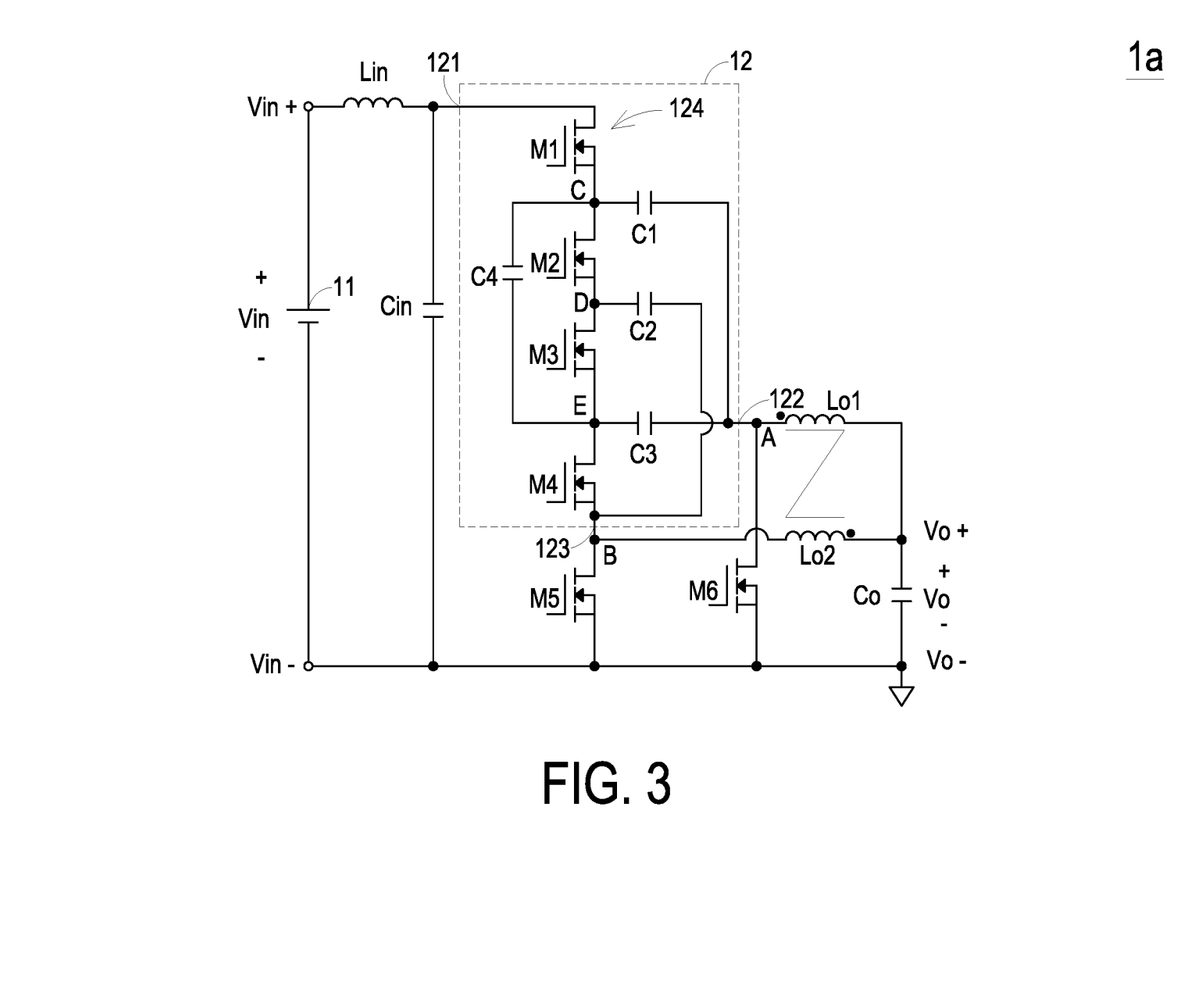
FIG. 3 is a schematic circuit diagram illustrating a power conversion circuit according to a second embodiment of the present disclosure.
Figure 4:
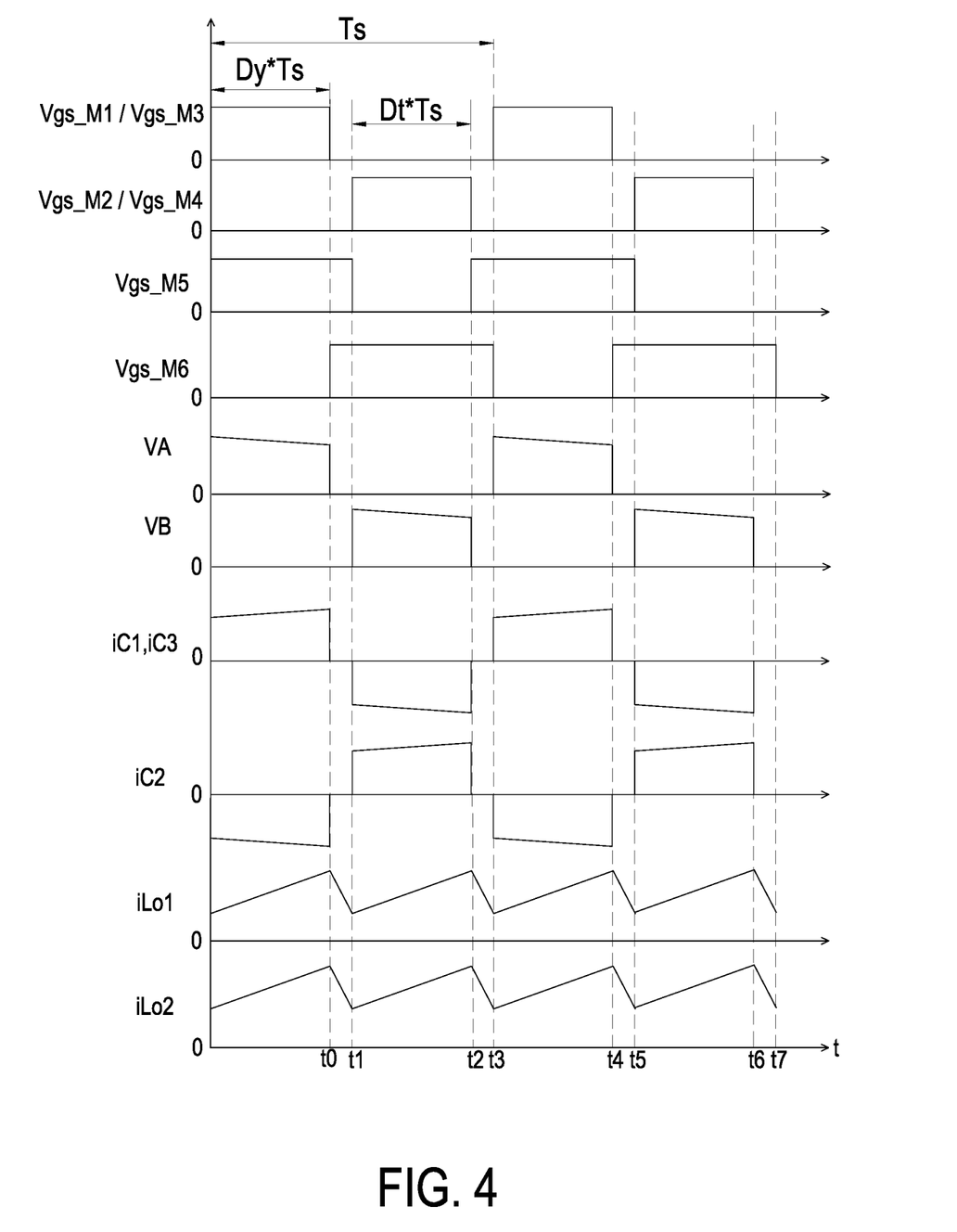
FIG. 4 is a schematic oscillogram of some components of the power conversion circuit shown in FIG. 3.

In an embodiment, in order to reduce the output current ripple of the first output inductor Lo1 and the second output inductor Lo2 and improve the efficiency of the power conversion circuit, the first output inductor Lo1 and the second output inductor Lo2 may be formed by coupling inductors. Please refer to FIG. 3 and FIG. 4. FIG. 3 is a schematic circuit diagram illustrating a power conversion circuit according to a second embodiment of the present disclosure. FIG. 4 is a schematic oscillogram of some components of the power conversion circuit shown in FIG. 3. As shown in FIG. 3, compared with the power conversion circuit 1 shown in FIG. 1, the first output inductor Lo1 and the second output inductor Lo2 of the power conversion circuit 1a in this embodiment are coupled to each other. That is, the first output inductor Lo1 and the second output inductor Lo2 may be wound around the same magnetic core (not shown). The first terminal of the first output inductor Lo1 (i.e., the terminal of the first output inductor Lo1 connected to the first connection node A) and the second terminal of the second output inductor Lo2 (i.e., the terminal of the second output inductor Lo2 connected to the positive output terminal Vo+) are dotted terminals. In addition, in this embodiment, the coupling coefficient between the first output inductor Lo1 and the second output inductor Lo2 is greater than or equal to 0.33. In another embodiment, the coupling coefficient between the first output inductor Lo1 and the second output inductor Lo2 may be greater than or equal to 0.66. In further another embodiment, the coupling coefficient between the first output inductor Lo1 and the second output inductor Lo2 may be greater than or equal to 0.9.

According to the oscillogram of FIG. 4 and the circuit diagram of FIG. 3, since the first output inductor Lo1 and the second output inductor Lo2 are coupled to each other, the voltage VA of the first connection node A is applied to both the first output inductor Lo1 and the second output inductor Lo2, and the voltage VB of the second connection node B is also applied to both the first output inductor Lo1 and the second output inductor Lo2. During the period from 0 to time t0 and the period from time t1 to t2, the current iLo1 flowing through the first output inductor Lo1 increases gradually, and the current iLo2 flowing through the second output inductor Lo2 increases gradually. During the period from time t0 to t1 and the period from time t2 to t3, the current iLo1 flowing through the first output inductor Lo1 decreases gradually, and the current iLo2 flowing through the second output inductor Lo2 decreases gradually. Due to the coupling relation between the first output inductor Lo1 and the second output inductor Lo2, the frequency of the current ripple through the first output inductor Lo1 and the second output inductor Lo2 is doubled, and the ripple amplitude is greatly reduced, thereby improving the efficiency of the power conversion circuit 1a.

Figure 5:
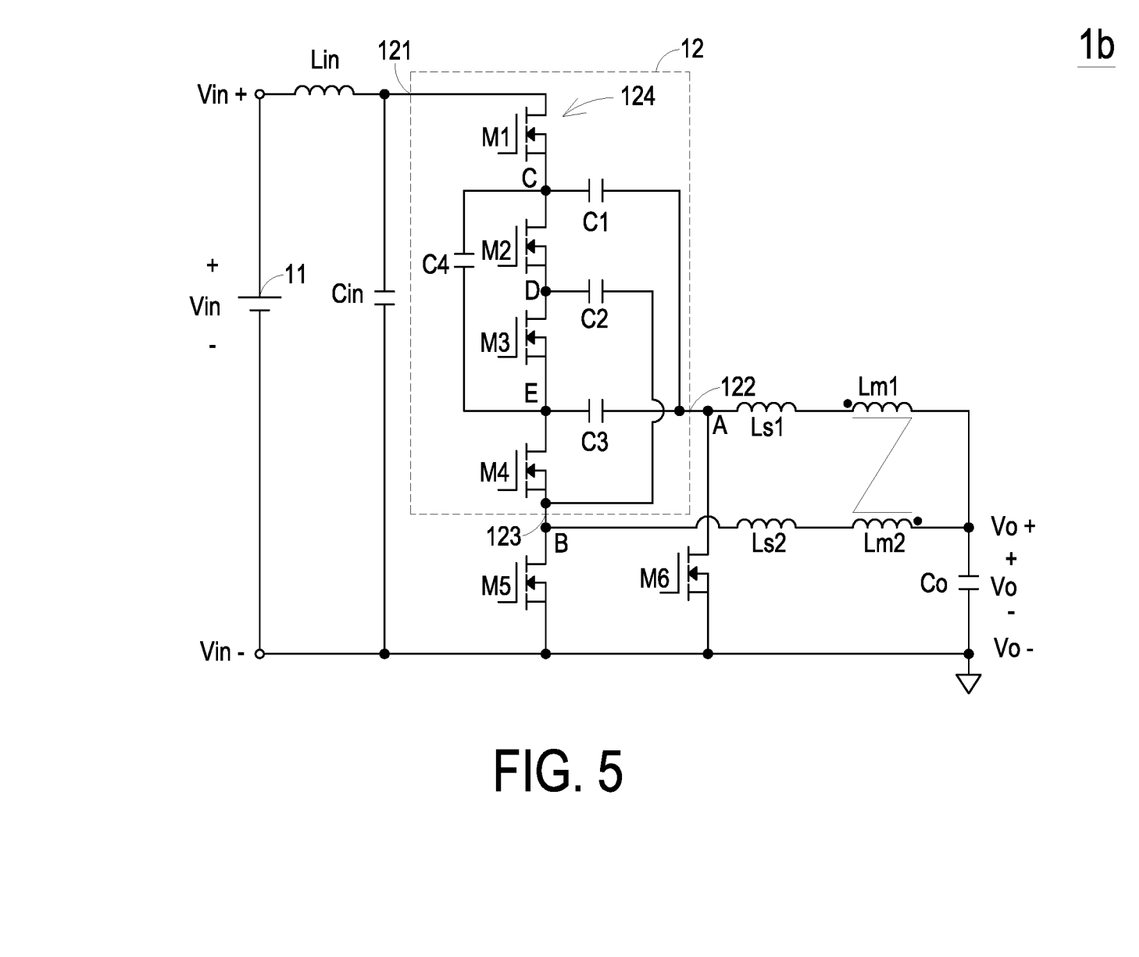
FIG. 5 is a schematic circuit diagram illustrating a power conversion circuit according to a third embodiment of the present disclosure.
Figure 6:
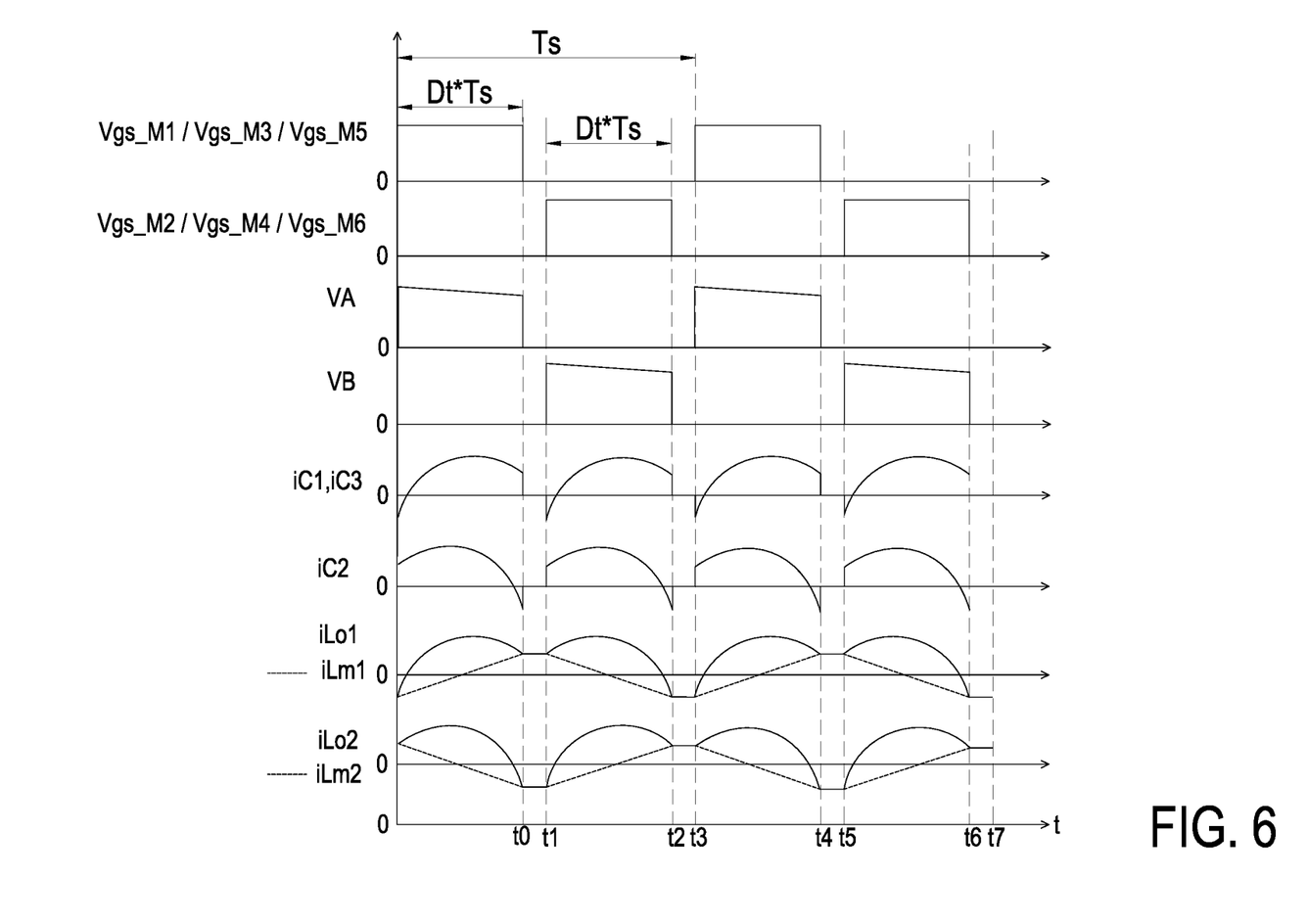
FIG. 6 is a schematic oscillogram of some components of the power conversion circuit shown in FIG. 5.

Please refer to FIG. 5 and FIG. 6. FIG. 5 is a schematic circuit diagram illustrating a power conversion circuit according to a third embodiment of the present disclosure. FIG. 6 is a schematic oscillogram of some components of the power conversion circuit shown in FIG. 5. Compared with the power conversion circuit 1 shown in FIG. 1, in the power conversion circuit 1b of this embodiment, the first output inductor is equivalent as being formed by a first leakage inductor Ls1 and a first magnetizing inductance Lm1 connected in series, and the second output inductor is equivalent as being formed by a second leakage inductor Ls2 and a second magnetizing inductance Lm2 connected in series. Further, the second output inductor and the first output inductor are coupled to each other, namely the second output inductor and the first output inductor may be wound around the same magnetic core (not shown). The first terminal of the first magnetizing inductance Lm1 and the second terminal of the second magnetizing inductance Lm2 are dotted terminals, and the equivalent inductance of the first magnetizing inductance Lm1 is equal to the equivalent inductance of the second magnetizing inductance Lm2. In this embodiment, the coupling coefficient between the first output inductor and the second output inductor is greater than or equal to 0.66. In another embodiment, the coupling coefficient between the first output inductor and the second output inductor is greater than or equal to 0.9.

In this embodiment, the first output inductor and the second output inductor respectively resonate with the first storage capacitor C1, the second storage capacitor C2, the third storage capacitor C3 and the input capacitor Cin, and thus the waveform of the currents flowing through the first output inductor and the second output inductor is approximate to sinusoidal wave (under the assumption that iLm1=iLm2=0). Accordingly, the power conversion circuit 1b may utilize the sinusoidal currents of the first output inductor and the second output inductor to realize the zero-current turn-on or turn-off of the first switch M1, the second switch M2, the third switch M3, the fourth switch M4, the first grounding switch M5, and the second grounding switch M6 (i.e., the zero-current switching of the switches). Moreover, when the first switch M1, the second switch M2, the third switch M3, the fourth switch M4, the first grounding switch M5 and the second grounding switch M6 are all turned off, the first magnetizing inductance Lm1 of the first output inductor and the second magnetizing inductance Lm2 of the second output inductor respectively draw the junction capacitance charges of the first switch M1, the second switch M2, the third switch M3, the fourth switch M4, the first grounding switch M5 and the second grounding switch M6 continuously. Thereby, the zero-voltage turn-on of the first switch M1, the second switch M2, the third switch M3, the fourth switch M4, the first grounding switch M5 and the second grounding switch M6 are realized. The control method of the power conversion circuit 1b in this embodiment for realizing the zero-current switching and zero-voltage turn-on of switches would be described as follows.

In FIG. 6, Vgs_M1, Vgs_M2, Vgs_M3, Vgs_M4, Vgs_M5, and Vgs_M6 are the gate-source voltages of the first switch M1, the second switch M2, the third switch M3, the fourth switch M4, and the first grounding switch M5, and the second grounding switch M6 respectively (corresponding to the driving signals of the switches M1-M6, which all have the duty ratio approximately equal to 50%). VA and VB are the voltage of the first connection node A and the voltage of the second connection node B respectively. iC1, iC2 and iC3 are the currents flowing through the first storage capacitor C1, the second storage capacitor C2 and the third storage capacitor C3 respectively. iLo1 is the current flowing through the first output inductor which is formed by the first leakage inductor Ls1 and the first magnetizing inductance Lm1. iLo2 is the current flowing through the second output inductor which is formed by the second leakage inductor Ls2 and the second magnetizing inductance Lm2. iLm1 and iLm2 are the currents flowing through the first magnetizing inductance Lm1 and the second magnetizing inductance Lm2 respectively.

According to the oscillogram of FIG. 6 and the circuit diagram of FIG. 5, since the first output inductor and the second output inductor are coupled to each other, the voltage VA of the first connection node A is applied to the first output inductor, the second output inductor and the output capacitor Co simultaneously, and the voltage VB of the second connection node B is also applied to the first output inductor, the second output inductor and the output capacitor Co simultaneously.

During the period from 0 to time t0 and the period from time t1 to t2, the current iLo1 flowing through the first output inductor is resonated to increase and then is resonated to decrease. When the current iLo1 flowing through the first output inductor decreases to be equal to the current iLm1 flowing through the first magnetizing inductance Lm1, the first switch M1, the third switch M3 and the first grounding switch M5 are switched from the on state to the off state, and the second switch M2, the fourth switch M4 and the second grounding switch M6 are switched from the off state to the on state. That is, during the period from 0 to time t0 and the period from time t1 to t2, the power conversion circuit 1b realizes the zero-current switching of the first switch M1, the second switch M2, the third switch M3, the fourth switch M4, the first grounding switch M5 and the second grounding switch M6. In addition, during the period from time t0 to t1 and the period from time t2 to t3, the current iLo1 flowing through the first output inductor is equal to the current iLm1 flowing through the first magnetizing inductance Lm1. Accordingly, the current iLo1 flowing through the first output inductor may draws the junction capacitance charges of the first switch M1, the second switch M2, the third switch M3, the fourth switch M4, the first grounding switch M5 and the second grounding switch M6, so as to realize the zero-voltage turn-on of the first switch M1, the second switch M2, the third switch M3, the fourth switch M4, the first grounding switch M5 and the second grounding switch M6.

Similarly, during the period from 0 to time t0 and the period from time t1 to t2, the current iLo2 flowing through the second output inductor is resonated to increase and then is resonated to decrease. When the current iLo2 flowing through the second output inductor decreases to be equal to the current iLm2 flowing through the second magnetizing inductance Lm2, the first switch M1, the third switch M3 and the first grounding switch M5 are switched from the on state to the off state, and the second switch M2, the fourth switch M4 and the second grounding switch M6 are switched from the off state to the on state. That is, during the period from 0 to time t0 and the period from time t1 to t2, the power conversion circuit 1b realizes the zero-current switching of the first switch M1, the second switch M2, the third switch M3, the fourth switch M4, the first grounding switch M5 and the second grounding switch M6. In addition, during the period from time t0 to t1 and the period from time t2 to t3, the current iLo2 flowing through the second output inductor is equal to the current iLm2 flowing through the second magnetizing inductance Lm2. Accordingly, the current iLo2 flowing through the second output inductor may draws the junction capacitance charges of the first switch M1, the second switch M2, the third switch M3, the fourth switch M4, the first grounding switch M5 and the second grounding switch M6, so as to realize the zero-voltage turn-on of the first switch M1, the second switch M2, the third switch M3, the fourth switch M4, the first grounding switch M5 and the second grounding switch M6.

In this embodiment, the power conversion circuit 1b operates in a resonant state so that the waveforms of the currents flowing through the first switch M1, the second switch M2, the third switch M3, the fourth switch M4, the first grounding switch M5 and the second grounding switch M6 are all approximate to sinusoidal wave. The power conversion circuit 1b has a resonant cycle and a resonant frequency in the resonant state. The resonant cycle is formed by the resonance between an equivalent inductance of the first leakage inductor Ls1 and the second leakage inductor Ls2 connected in series and an equivalent capacitor of the first storage capacitor C1, the second storage capacitor C2 and the third storage capacitor C3, where the equivalent inductance and the equivalent capacitance are connected in series. The resonant cycle is determined by $$Ls1 + Ls2 \text{ and } C3 + \left(C1 \times \frac{C2}{(C1 + C2)}\right)$$

collaboratively, where Ls1 represents the inductance of the first leakage inductor, Ls2 represents the inductance of the second leakage inductor, C1 represents the capacitance of the first storage capacitor, C2 represents the capacitance of the second storage capacitor, and C3 represents the capacitance of the third storage capacitor. The resonant frequency is the reciprocal of the resonant cycle. When the switching frequency of the power conversion circuit 1b is greater than or equal to the resonant frequency, the zero-current turn-off of the first switch M1, the second switch M2, the third switch M3, the fourth switch M4, the first grounding switch M5 and the second grounding switch M6 can be realized. Further, when the first switch M1, the second switch M2, the third switch M3, the fourth switch M4, the first grounding switch M5 and the second grounding switch M6 are all turned off, the current iLm1 flowing through the first magnetizing inductance Lm1 and the current iLm2 flowing through the second magnetizing inductance Lm2 draw the junction capacitance charges of the first switch M1, the second switch M2, the third switch M3, the fourth switch M4, the first grounding switch M5 and the second grounding switch M6 continuously. Thereby, the zero-voltage turn-on of the first switch M1, the second switch M2, the third switch M3, the fourth switch M4, the first grounding switch M5 and the second grounding switch M6 are realized. Consequently, in this embodiment, the switching losses of all the switches of the power conversion circuit 1b are greatly reduced, and thus the efficiency of the power conversion circuit 1b is improved.

Figure 7:
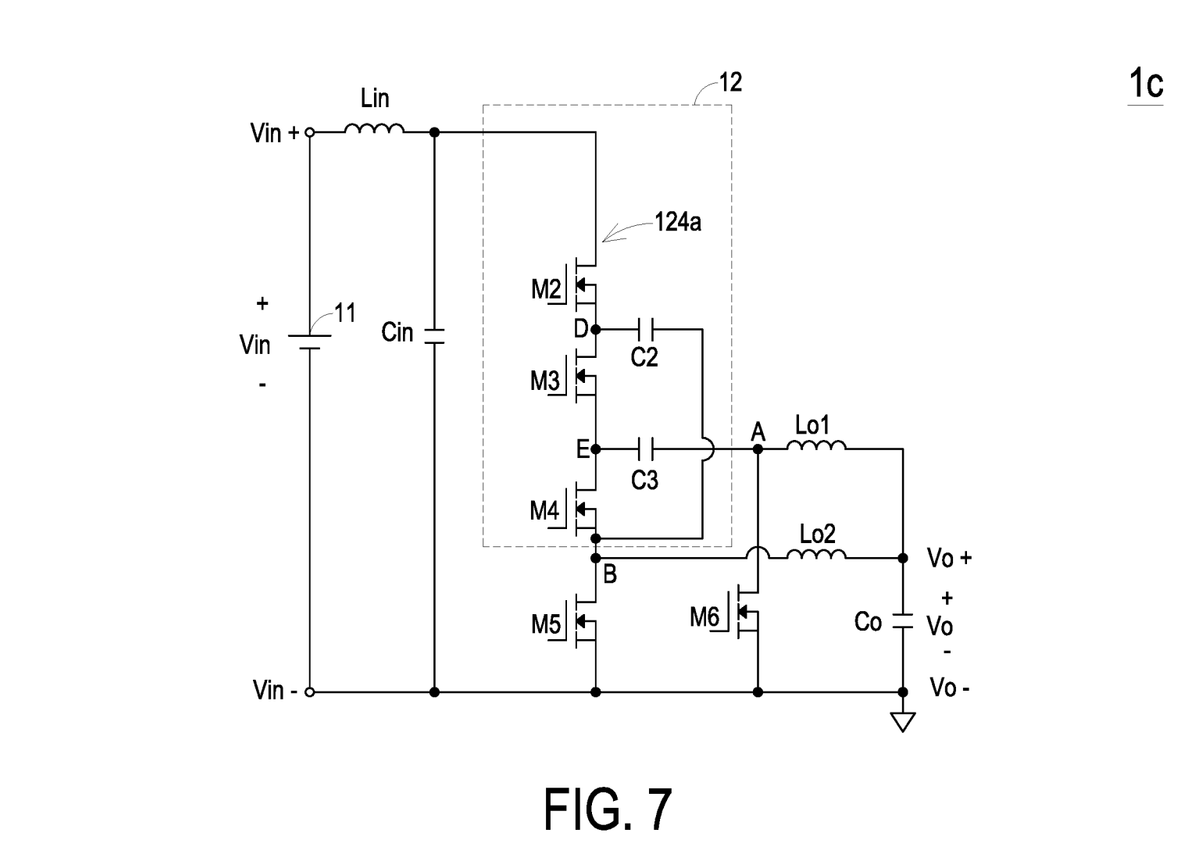
FIG. 7 is a schematic circuit diagram illustrating a power conversion circuit according to a fourth embodiment of the present disclosure.

In an embodiment, the number of the storage capacitors of the power conversion circuit is not limited to three (as shown in FIG. 1) and may be any integer greater than 1. Please refer to FIG. 7. FIG. 7 is a schematic circuit diagram illustrating a power conversion circuit according to a fourth embodiment of the present disclosure. As shown in FIG. 7, compared with the switch bridge arm 124 of the switch control assembly 12 shown in FIG. 1 which includes four switches, three storage capacitors and a clamping capacitor, the switch bridge arm 124 of the power conversion circuit 1c in the fourth embodiment includes only three switches (i.e., the second switch M2, the third switch M3 and the fourth switch M4) and only two storage capacitors (i.e., the second storage capacitor C2 and the third storage capacitor C3). The connection relations among the second switch M2, the third switch M3, the fourth switch M4, the second storage capacitor C2 and the third storage capacitor C3 in this embodiment are similar to that shown in FIG. 1, and thus the detailed descriptions thereof are omitted herein. In addition, in this embodiment, the second switch M2, the third switch M3 and the fourth switch M4 of the switch bridge arm 124 may form a three-switch unit 124a and may be regarded as the upper switch, the middle switch and the lower switch of the switch bridge arm 124. Further, the second storage capacitor C2 may be regarded as a first cross-connected storage capacitor.

According to the circuit diagram of the power conversion circuit 1c shown in FIG. 7 and the oscillogram of FIG. 2, during the period from 0 to time t0, the high voltage of the first terminal of the first output inductor Lo1 (i.e., the high voltage amplitude of the first connection node A) equals a difference between the DC component amplitude of the input voltage Vin and the DC component amplitude of the voltage of the first storage capacitor C2, or equals the DC component amplitude of the voltage of the third storage capacitor C3. During the period from time t1 to t2, the high voltage of the first terminal of the second output inductor Lo2 (i.e., the high voltage amplitude of the second connection node B) equals a difference between the DC component amplitude of the voltage of the second storage capacitor C2 and the DC component amplitude of the voltage of the third storage capacitor C3. As shown in FIG. 7, the second terminal of the first output inductor Lo1 is directly connected to the second terminal of the second output inductor Lo2, and thus the average voltage of the first terminal of the first output inductor Lo1 is equal to the average voltage of the first terminal of the second output inductor Lo2. Consequently, the amplitude difference between the DC components of the input voltage Vin and the voltage of the second storage capacitor C2, the amplitude difference between the DC components of the voltages of the second storage capacitor C2 and the third storage capacitor C3, and the DC component amplitude of the voltage of the third storage capacitor C3 are equal. According to the above relations, it can be derived that the DC component amplitude of the input voltage Vin is three times of the DC component amplitude of the voltage of the third storage capacitor C3, and the DC component amplitude of the voltage of the second storage capacitor C2 is two times of the DC component amplitude of the voltage of the third storage capacitor C3.

Further, according to the above relations, the DC component amplitude of the voltage of the second storage capacitor C2 is ⅔ times of the DC component amplitude of the input voltage Vin. The DC component amplitude of the voltage of the third storage capacitor C3 is ⅓ times of the DC component amplitude of the input voltage Vin. Among the second storage capacitor C2 and the third storage capacitor C3, the power conversion circuit 1c obtains the output voltage Vo according to the storage capacitor with the lower DC component amplitude of voltage (i.e., the third storage capacitor C3). The expression for the output voltage Vo is shown as Vo=Dt*VC3=Dt*Vin/(n+1), where Vo represents the voltage amplitude of the output voltage, Dt is the duty ratio of the first driving signal, VC3 is the DC component amplitude of the voltage of the third storage capacitor C3, Vin represents the DC component amplitude of the input voltage, n is the number of storage capacitors and is an integer greater than 1. For example, in the embodiment shown in FIG. 7, the power conversion circuit 1c includes two storage capacitors (C2, C3), and thus Vo=Dt*VC3=Dt*Vin/3.

Figure 8:
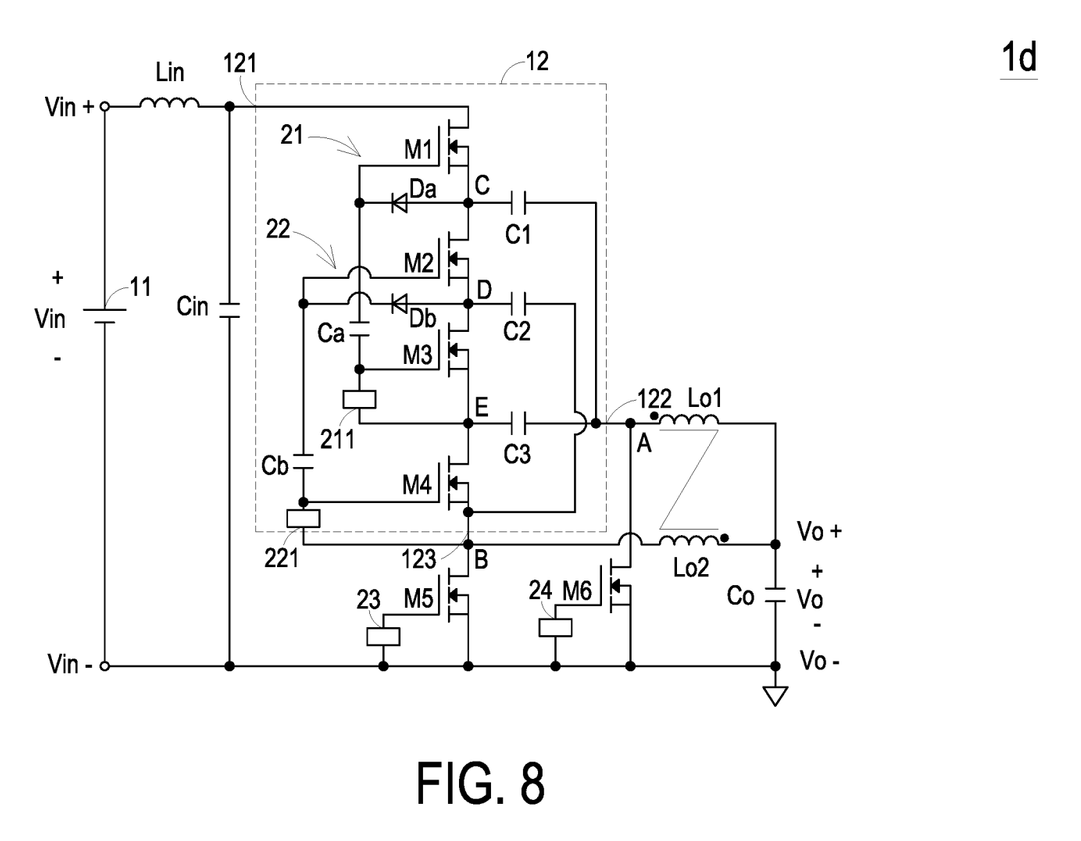
FIG. 8 is a schematic circuit diagram illustrating a power conversion circuit according to a fifth embodiment of the present disclosure.

According to the circuit diagrams of the power conversion circuit shown in FIG. 1 and FIG. 3, the power conversion circuit includes a plurality of floating switches and a plurality of grounding switches. As exemplified in FIG. 1 and FIG. 3, the first switch M1, the second switch M2, the third switch M3 and the fourth switch M4 are floating switches, and the first grounding switch M5 and the second grounding switch M6 are grounding switches. In addition, the power conversion circuit shown in FIG. 1 and FIG. 3 needs to include six driving units for driving the first switch M1, the second switch M2, the third switch M3, the fourth switch M4, the first grounding switch M5 and the second grounding switch M6 respectively. In order to reduce the volume of the power conversion circuit, the power conversion circuit may drive the switches with fewer drive units in some embodiments. Please refer to FIG. 8. FIG. 8 is a schematic circuit diagram illustrating a power conversion circuit according to a fifth embodiment of the present disclosure. The power conversion circuit 1d in this embodiment includes a first driving circuit 21, a second driving circuit 22, a third driving circuit 23 and a fourth driving circuit 24. All the switches in this embodiment are MOSFETs, and the first terminal, the second terminal and the driving terminal of the switch are drain, source and gate respectively. The first driving circuit 21 is electrically connected between the third connection node C and the fifth connection node E, and is electrically connected to the gate of the first switch M1 and the gate of the third switch M3. In this embodiment, the first driving circuit 21 includes a first driving diode Da, a first driving capacitor Ca, and a first driving unit 211 electrically connected in series between the third connection node C and the fifth connection node E sequentially. An anode of the first driving diode Da is electrically connected to the third connection node C (i.e., the source of the first switch M1). A connection node between a cathode of the first driving diode Da and the first driving capacitor Ca is further electrically connected to the gate of the first switch M1. A connection node between the first driving capacitor Ca and the first driving unit 211 is further electrically connected to the gate of the third switch M3.

According to the connection relations of components of the first driving circuit 21, when the driving signal of the third switch M3 is low, the first storage capacitor C1 and the third storage capacitor C3 are connected in series to charge the first driving capacitor Ca through the first driving diode Da. In addition, when the first driving signal outputted by the first driving unit 211 is at high level, the first driving unit 211 may charge the parasitic capacitance Cgs of the third switch M3 directly, and may charge the parasitic capacitance Cgs of the first switch M1 through the first driving capacitor Ca, the first storage capacitor C1 and the third storage capacitor C3 simultaneously. Alternatively, when the first driving signal outputted by the first driving unit 211 is at low level, the first driving unit 211 may discharge the parasitic capacitance Cgs of the third switch M3 directly, and may discharge the parasitic capacitance of the first switch M1 through the first driving capacitor Ca, the first storage capacitor C1 and the third storage capacitor C3 simultaneously. Consequently, the first switch M1 and the third switch M3 are driven by the same driving circuit (i.e., the first driving circuit 21). In an embodiment, the capacitance of the first driving capacitor Ca is greater than or equal to five times of the capacitance of the parasitic capacitance Cgs of the first switch M1.

The second driving circuit 22 is electrically connected between the fourth connection node D and the second connection node B, and is electrically connected to the gate of the second switch M2 and the gate of the fourth switch M4. In this embodiment, the second driving circuit 22 includes a second driving diode Db, a second driving capacitor Cb, and a second driving unit 221 electrically connected in series between the fourth connection node D and the second connection node B sequentially. An anode of the second driving diode Db is electrically connected to the source of the second switch M2. A connection node between a cathode of the second driving diode Db and the second driving capacitor Cb is further electrically connected to the gate of the second switch M2. A connection node between the second driving capacitor Cb and the second driving unit 221 is further electrically connected to the gate of the fourth switch M4. The third driving circuit 23 is electrically connected between the gate of the first grounding switch M5 and the negative output terminal Vo− and is formed as a single driving unit. The fourth driving circuit 24 is electrically connected between the gate of the second grounding switch M6 and the negative output terminal Vo− and is formed as a single driving unit.

According to the connection relations of components of the second driving circuit 22, when the driving signal of the fourth switch M4 is low, the second storage capacitor C2 charges the second driving capacitor Cb through the second driving diode Db. In addition, when the second driving signal outputted by the second driving unit 221 is at high level, the second driving unit 221 may charge the parasitic capacitance Cgs of the fourth switch M4 directly, and may charge the parasitic capacitance Cgs of the second switch M2 through the second driving capacitor Cb and the second storage capacitor C2 simultaneously. Alternatively, when the second driving signal outputted by the second driving unit 221 is at low level, the second driving unit 221 may discharge the parasitic capacitance Cgs of the fourth switch M4 directly, and may discharge the parasitic capacitance Cgs of the second switch M2 through the second driving capacitor Cb and the second storage capacitor C2 simultaneously. Consequently, the second switch M2 and the fourth switch M4 are driven by the same driving circuit (i.e., the second driving circuit 22). In an embodiment, the capacitance of the second driving capacitor Cb is greater than or equal to five times of the capacitance of the parasitic capacitance Cgs of the second switch M2.

In this embodiment, the second switch M2, the third switch M3 and the fourth switch M4 of the switch bridge arm 124 may form a three-switch unit, where the second switch M2, the third switch M3 and the fourth switch M4 are regarded as the upper switch, the middle switch and the lower switch respectively. Moreover, the second storage capacitor C2 may be regarded as a first cross-connected storage capacitor, the first switch M1 may be regarded as a series switch, the first storage capacitor C1 may be regarded as a second cross-connected storage capacitor, and the second driving circuit 22 may be regarded as a first floating driving circuit. Correspondingly, the second driving diode Db may be regarded as a first floating driving diode, the second driving capacitor Cb may be regarded as a first floating driving capacitor, and the second driving unit 221 may be regarded as a first floating driving unit.

Otherwise, the first switch M1, the second switch M2 and the third switch M3 of the switch bridge arm 124 may form a three-switch unit, where the first switch M1, the second switch M2 and the third switch M3 may be regarded as the upper switch, the middle switch and the lower switch respectively. Moreover, the first storage capacitor C1 may be regarded as the first cross-connected storage capacitor, and the first driving circuit 21 may be regarded as the first floating driving circuit. Correspondingly, the first driving diode Da may be regarded as the first floating driving diode, the first driving capacitor Ca may be regarded as the first floating driving capacitor, and the first driving unit 211 may be regarded as the first floating driving capacitor. Actually, any three switches of the switch bridge arm connected in series may form a three-switch unit, and the first terminal and/or the third terminal of the three-switch unit may be connected in series to switches.

Of course, as exemplified in FIG. 7, the switch bridge arm may include only three switches (i.e., the second switch M2, the third switch M3 and the fourth switch M4) that form a three-switch unit, and the upper switch (i.e., the second switch M2) and the lower switch (i.e., the fourth switch M4) are driven by the first floating driving circuit. The specific driving way is similar to that stated above, and thus the detailed descriptions thereof are omitted herein.

In summary, according to the topologies of power conversion circuits and the corresponding control manners of the present disclosure, the output voltage of the power conversion circuit is Vo=Dt*Vin/(n+1). Namely, in the power conversion circuit, the output voltage is greatly reduced relative to the input voltage, and thus the function of voltage reduction is achieved. Moreover, a voltage-second product of the time and the voltage across the first output inductor and a voltage-second product of the time and the voltage across the second output inductor are both greatly reduced. Accordingly, the inductance, volume and loss of the first output inductor and the second output inductor are greatly reduced. Therefore, the load (i.e., the voltage regulation module) may receive the low output voltage outputted by the power conversion circuit, thereby reducing the overall volume of the voltage regulation module and increasing the power conversion density and conversion efficiency of the voltage regulation module.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit, comprising: a positive input terminal, a negative input terminal, a positive output terminal and a negative output terminal, wherein the negative input terminal is electrically connected to the negative output terminal and is grounded; a switch bridge arm, comprising at least one three-switch unit, wherein the at least one three-switch unit comprises a first terminal, a second terminal, a third terminal, an upper switch, a middle switch and a lower switch, the upper switch, the middle switch and the lower switch are electrically connected in series between the first terminal and the third terminal sequentially, the first terminal is electrically connected to the positive input terminal, and the upper switch and the lower switch are turned on and off synchronously; a first grounding switch, coupled between the third terminal and the negative input terminal; a first cross-connected storage capacitor, having a first terminal electrically connected to the upper switch and the middle switch and a second terminal electrically connected to the third terminal; and a first floating driving circuit, comprising a first floating driving diode, a first floating driving capacitor and a first floating driving unit electrically connected in series between a first terminal of the upper switch and a first terminal of the lower switch sequentially one after another, a first connection node connecting the first floating driving diode and the first floating driving capacitor is further electrically connected to a driving terminal of the upper switch, and a second connection node connecting the first floating driving capacitor and the first floating driving unit is further electrically connected to a driving terminal of the lower switch.

2. The power conversion circuit according to claim 1, wherein the upper switch and the lower switch both receive a first driving signal to turn on and off synchronously.

3. The power conversion circuit according to claim 2, wherein a duty ratio of the first driving signal is less than or equal to 50%.

4. The power conversion circuit according to claim 1, further comprising a first output inductor, a second output inductor and a second grounding switch, wherein a first terminal of the first output inductor is electrically connected to the second terminal of the three-switch unit to form a third connection node, a second terminal of the first output inductor is electrically connected to the positive output terminal, a first terminal of the second output inductor is electrically connected to the third terminal of the three-switch unit to form a fourth connection node, a second terminal of the second output inductor is electrically connected to the positive output terminal, the first grounding switch is electrically connected between the fourth connection node and the negative output terminal, and the second grounding switch is electrically connected between the third connection node and the negative output terminal.

5. The power conversion circuit according to claim 4, comprising n+1 switches and n storage capacitors, wherein n is an integer greater than 1, the upper switch, the middle switch and the lower switch are three of the n+1 switches, the first cross-connected storage capacitor is one of the n storage capacitors, and a voltage gain ratio of an output voltage and an input voltage of the power conversion circuit is Dt/(n+1), where Dt is a duty ratio of the power conversion circuit.

6. The power conversion circuit according to claim 5, wherein a DC component amplitude of a voltage of one of the n storage capacitors is equal to a DC component amplitude of an input voltage of the power conversion circuit divided by n+1.

7. The power conversion circuit according to claim 4, further comprising a first driving circuit and a second driving circuit, wherein the first driving circuit is electrically connected between the first grounding switch and the negative output terminal, and the second driving circuit is electrically connected between the second grounding switch and the negative output terminal.

8. The power conversion circuit according to claim 4, wherein a driving signal of the second grounding switch is complementary to a driving signal of the upper switch, and a driving signal of the first grounding switch is complementary to a driving signal of the middle switch.

9. The power conversion circuit according to claim 4, wherein the first output inductor and the second output inductor are coupled to each other.

10. The power conversion circuit according to claim 9, wherein a coupling coefficient between the first output inductor and the second output inductor is greater than or equal to 0.33.

11. The power conversion circuit according to claim 9, wherein a coupling coefficient between the first output inductor and the second output inductor is greater than or equal to 0.66.

12. The power conversion circuit according to claim 9, wherein a coupling coefficient between the first output inductor and the second output inductor is greater than or equal to 0.9.

13. The power conversion circuit according to claim 4, wherein the switch bridge arm further comprises a series switch and a second cross-connected storage capacitor, the series switch is electrically connected between the positive input terminal and the first terminal of the three-switch unit, a first terminal of the second cross-connected storage capacitor is electrically connected between the series switch and the upper switch, and a second terminal of the second cross-connected storage capacitor is electrically connected between the middle switch and the lower switch.

14. The power conversion circuit according to claim 13, further comprising a first driving circuit, wherein the first driving circuit comprises a first driving diode, a first driving capacitor and a first driving unit electrically connected in series between a first terminal of the series switch and a first terminal of the middle switch, a fifth connection node connecting the first driving diode and the first driving capacitor is further electrically connected to a driving terminal of the series switch, and a sixth connection node connecting the first driving capacitor and the first driving unit is further electrically connected to a driving terminal of the middle switch.

15. The power conversion circuit according to claim 13, wherein the upper switch and the lower switch both receive a driving signal to turn on and off synchronously, the middle switch and the series switch both receive a driving signal to turn on and off synchronously, a duty ratio of the driving signal of the middle and series switches is less than or equal to 50%, and the driving signal of the upper and lower switches and the driving signal of the middle and series switches have the same duty ratio and are out of phase with each other by 180 degrees.

16. The power conversion circuit according to claim 13, further comprising an input capacitor and a third storage capacitor, wherein a first terminal of the third storage capacitor is electrically connected to the second terminal of the three-switch unit, a second terminal of the third storage capacitor is electrically connected to the middle switch and the lower switch, and a capacitance of the input capacitor, a capacitance of the first cross-connected storage capacitor, a capacitance of the second cross-connected storage capacitor and a capacitance of the third storage capacitor satisfy two equations as follows:

$$C1 = C2 * \frac{C3}{C2 - C3},$$

$$Cin = C2 * \frac{1 - Dt}{2},$$

where Cin represents the capacitance of the input capacitor, C1 represents the capacitance of the second cross-connected storage capacitor, C2 represents the capacitance of the first cross-connected storage capacitor, C3 represents the capacitance of the third storage capacitor, and Dt is a duty ratio of the power conversion circuit.

17. The power conversion circuit according to claim 13, wherein the power conversion circuit further comprises a third storage capacitor, a first terminal of the third storage capacitor is electrically connected to the second terminal of the three-switch unit, a second terminal of the third storage capacitor is electrically connected to the middle switch and the lower switch, the power conversion circuit has a resonant cycle, the resonant cycle is formed by a resonance between an equivalent inductor of a leakage inductor of the first output inductor and a leakage inductor of the second output inductor connected in series and an equivalent capacitor of the first cross-connected storage capacitor, the second cross-connected storage capacitor and the third storage capacitor, the equivalent inductor and the equivalent capacitor are connected in series, and the resonant cycle is determined by $$Ls1 + Ls2 \text{ and } C3 + \left( C1 \times \frac{C2}{(C1 + C2)} \right)$$

collaboratively, where Ls1 represents an inductance of the leakage inductor of the first output inductor, Ls2 represents an inductance of the leakage inductor of the second output inductor, C1 represents a capacitance of the second cross-connected storage capacitor, C2 represents a capacitance of the first cross-connected storage capacitor, and C3 represents a capacitance of the third storage capacitor.

18. The power conversion circuit according to claim 17, wherein the power conversion circuit has a resonant frequency which is a reciprocal of the resonant cycle, and a switching frequency of the power conversion circuit is greater than or equal to the resonant frequency.

19. The power conversion circuit according to claim 1, wherein a capacitance of the first floating driving capacitor is greater than or equal to a capacitance of a parasitic capacitor between the driving terminal and the first terminal of the upper switch.

* * * * *